United States Patent [19]
Lang et al.

[11] Patent Number: 5,391,839
[45] Date of Patent: Feb. 21, 1995

[54] DEVICE FOR THE ELECTRICALLY INSULATED ATTACHMENT OF A METALLIC PROBE ELECTRODE IN THE OPENING OF A HOUSING

[75] Inventors: Hugo Lang, Pfeffingen, Switzerland; Miroslaw Alznauer, Wies, Germany

[73] Assignee: Endress + Hauser GmbH + Co., Maulburg, Germany

[21] Appl. No.: 969,184

[22] PCT Filed: Jun. 5, 1992

[86] PCT No.: PCT/DE92/00462
 § 371 Date: Feb. 4, 1993
 § 102(e) Date: Feb. 4, 1993

[87] PCT Pub. No.: WO92/21943
 PCT Pub. Date: Dec. 10, 1992

[30] Foreign Application Priority Data
 Jun. 7, 1991 [DE] Germany .............................. 4118715

[51] Int. Cl.⁶ .............................................. G01F 23/26
[52] U.S. Cl. .................................. 174/65 R; 73/304 C; 324/448
[58] Field of Search ......... 361/284; 73/304 R, 304 C; 324/448; 174/65 R

[56] References Cited
U.S. PATENT DOCUMENTS
3,477,290 11/1969 Lerner ............................... 73/304 C

FOREIGN PATENT DOCUMENTS
| | | |
|---|---|---|
| 0101580 | 2/1984 | European Pat. Off. . |
| 2744864 | 4/1979 | Germany . |
| 2064128 | 6/1981 | United Kingdom .............. 73/304 C |
| 1599695 | 10/1981 | United Kingdom . |
| 2079950 | 1/1982 | United Kingdom .............. 73/304 C |

*Primary Examiner*—Leo P. Picard
*Assistant Examiner*—David Tone
*Attorney, Agent, or Firm*—Barnes & Thornburg

[57] ABSTRACT

A device is proposed for the electrically insulated attachment of a metal probe electrode in the opening of a housing, preferably a measuring probe for measuring the filling status in the opening of a probe head housing. The device has a metal rod electrode and a metal guard electrode at which two sealing cones are arranged which are spatially separated from each other which, with the inclusion of insulating layers, electrically insulate and close off in a pressure-sealed manner the rod electrode with respect to the guard electrode and both with respect to the housing in the opening of which they are attached. Both electrodes are connected with an electronic circuit in an electrically insulated manner.

33 Claims, 4 Drawing Sheets

DEVICE FOR THE ELECTRICALLY INSULATED ATTACHMENT OF A METALLIC PROBE ELECTRODE IN THE OPENING OF A HOUSING

The invention relates to a device for the electrically insulated and pressure-sealed attachment of a metallic probe electrode in the opening of a housing, preferably in the opening of a probe head housing of a measuring probe for measuring the filling status (level) inside a container or also the level height in a channel. In order to determine the content, i.e., the height of the contents in a container or the level height in a channel, frequently capacitive or conductive measuring probes are used. Such capacitive probes are suited for contents. Since the dielectric constant is different from that of the air. For this purpose, the electrode of the measuring probe represents the one electrode, the metallic container wall of the container, the filling height of which is to be measured, represents the second electrode and the filling material represents the dielectric of a precision capacitor.

Depending on the level, the measuring probe is more or less covered by the filling material. Depending on the overlap, the capacitance of the capacitor changes. With an electronic circuit, frequently arranged at the measuring site in the interior of the probe head housing, this capacitance change is determined. Advantageously, this is brought about in that an alternating current is applied to the measuring electrodes of the precision capacitor and the capacitive alternating current flowing through the precision capacitor is measured, converted into a measuring signal and transferred to a switching station which is located, in most cases, away from the measuring probe. In the switching station, indicator devices then show the existing level, or switching elements are operated which intervene with actuators in the course of a process in a controlling manner.

By means of suitable means already known to the expert it can be achieved that the electrical field distribution of the precision capacitor remains the same across the entire length of the measuring probe, so that the capacitance change is directly proportional to the level change.

However, very often conditions exist in the containers, due to the contents to be measured, which can influence the measurement or can destroy the measuring probe itself. Thus, for example, increased temperature, high pressure or corrosive measuring media may exist. Thus, thermal, mechanical or chemical influences may change the capacitance, that condensation deposits on the probe or the capacitance of the probe is increased due to an accumulation of filling material in the area of attachment, i.e., near the passage of the probe through the container wall. Thus, the total capacitance of such measuring probes is composed of the probe capacitance, i.e., the capacitance along the actual measuring probe and the capacitance in the attachment area, i.e., near the passage through the container wall. In order to eliminate these influences which may bring about a falsification of the measuring results, it is usually customary to arrange a metallic protection electrode (guard electrode) between the container wall and the measuring electrode. It is its task to influence the field distribution of the measuring capacitor such that these negative influences cannot falsify the measuring signal. Since, very frequently an increased pressure is also part of the negative influences, it is additionally necessary to seal off the interior of the probe head housing such that, with respect to the interior of the container, no pressure can escape and thus no aggressive medium can come into contact with the electrical circuit arranged in the interior of the probe head housing and destroy the same. Naturally, however, the sealing must take place such that the measuring electrode, acting as an electrode of the measuring capacitor, remains in electrical connection with the electronic circuit. This is also necessary for the metallic guard electrode.

From the German Patent No. 27 44 864 (Offenlegungsschrift), a device for attaching a probe in the opening of a container is known. Here, for achieving a pressure-sealed attachment of the probe electrode in the opening, which is conically expanding towards the container side, and for carrying out the probe connection in an insulated manner through this opening, an intermediate piece, provided with a conical outer surface and connected with the probe, is arranged which is attached by means of a screw connection, attached to the side facing away from the interior of the container and pressing the conical surfaces together through the action of a spring. The device proposed in the German Patent No. 27 44 864 (Offenlegungsschrift) presumes the absence of a metallic guard electrode.

In comparison thereto, the invention has the task of proposing a device for the electrically insulated and pressure-sealed attachment of a metallic probe electrode in the opening of a housing, wherein a probe electrode as well as a metallic guard electrode can be attached in the opening of a housing by means of a single screw connection. The invention assures a secure pressure seal of both electrodes, the mutual electrical insulation as well as with respect to the metallic container wall and the insulated electrical connection of the electrode parts with the electronic circuit arranged in the interior of the probe head housing.

This task is solved by the characteristics cited in the patent claims.

Additional characteristics and advantages of the invention result from the following description of examples by means of the drawings.

In the drawings:

FIG. 5 shows an axial cross section and a view from below the insulation nut;

Figure 1:
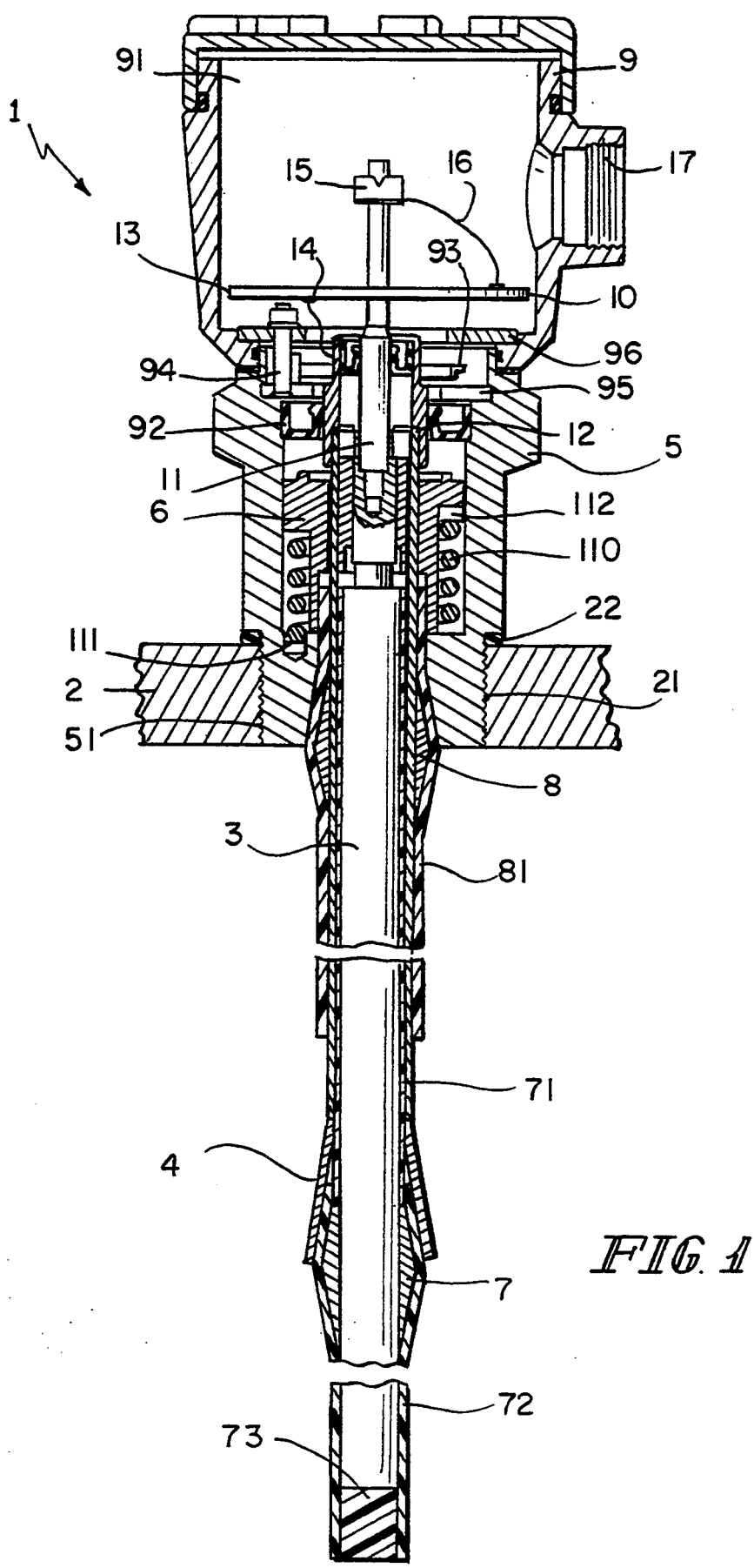
FIG. 1 shows an axial cross section of a first example of the invention.

In FIG. 1, under (1) a capacitive measuring probe for measuring the level in a container or the level height in a channel is shown. The measuring probe (1) represents the one electrode of a capacitor with the aid of which the height of the filling status is to be determined. For this purpose, the measuring probe (1) is attached in the metallic wall (2) of a container which acts as the other electrode of the measuring probe. For the attachment of the measuring probe (1), a bore (21), provided with an inner thread, penetrates the container wall (2) and the measuring probe (1) has an outer thread (51) with which the probe is screwed into the container wall (2). For sealing the interior of the container, the measuring probe (1) is supported by the surfaces of a sealing ring (22).

The measuring probe (1) is composed of the actual rod electrode (3), the guard electrode (4), the screw-in part (5), the insulation nut (6), the sealing cone-shaped connections (7, 8), the probe head housing (9), as well as the electronic circuit (10) with the electrical connection and hook-up parts.

Figure 2:
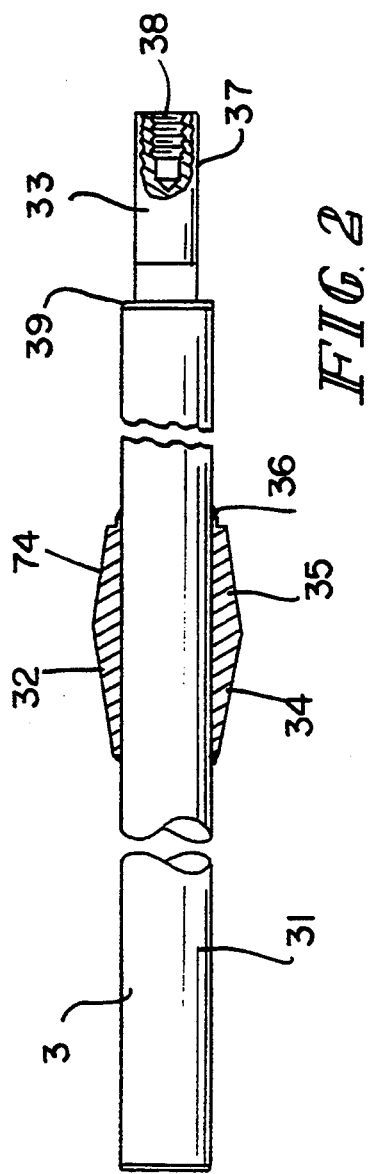
FIG. 2 shows an axial cross section of the probe electrode.

The rod electrode (3), shown in detail in FIG. 2, represents the active portion of the measuring probe (1). It consists of the probe rod (31), the sealing cone (32) and the connection and attachment bolt (33). The probe rod (31) is produced from metal, preferably a weldable steel. The sealing cone (32) has the shape of a bushing with the shape of two truncated cones extending from the center and tapering off on both sides. It may also be produced in a metal-cutting process from a weldable steel. The two truncated cones each form a cone surface (34, 35). While the cone surface (34), as we can see later, facilitates the application of an insulation layer, the cone surface (35) represents the first part of the sealing cone connection of the measuring probe (1) in accordance with the invention. The recess (36) also serves for the purpose of accommodating an insulation layer, which encircles the probe rod (31) at the end of the sealing cone (35) facing the connection and the attachment bolt (33). The position of the sealing cone (32) on the rod (31) is selected such that in the assembled state of the measuring probe (1), the cone surface (35) interacts with the cone surface (42) of the guard electrode (4). At the end facing the container wall, a short cylindrical section of smaller diameter extends at the probe rod (31). The latter forms the connection and attachment bolt (33). For this purpose, the connection and attachment bolt (33) is provided at its end with the outer thread (37). Furthermore, at the front face, coaxially to the symmetrical axis, a threaded bore (38) is provided. Due to the smaller diameter of the connection and attachment bolt (33), a shoulder (39) is formed at the probe rod (31).

Figure 3:
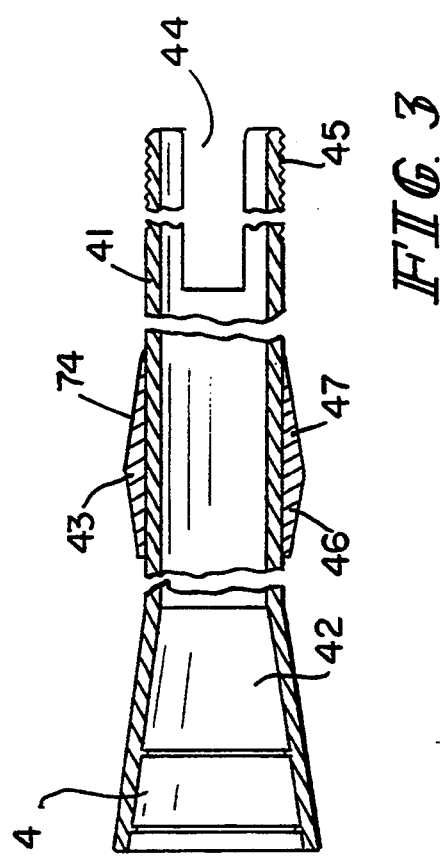
FIG. 3 shows an axial cross section of the guard electrode.
Figure 3A:
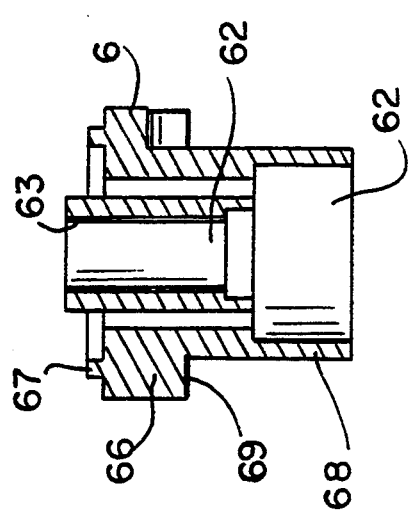
Figure 3B:
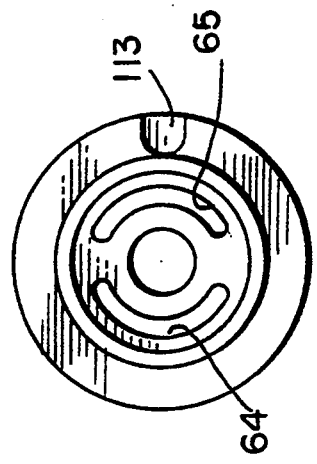

FIG. 3 shows an axial cross section of the guard electrode (4). The guard electrode (4) is composed of the tubular portion (41) and the sealing cones (42, 43). The sealing cone (42) extends with increasing diameter in the direction towards the interior of the container. The length and the incline of the conical surfaces of the sealing cone (42) are selected so that the inner surface of the sealing cone (42) corresponds to the conical surface (35) of the sealing cone (32). The tubular part (41) and the sealing cone (42) are produced from metal, preferably of a weldable steel, and are connected with each other by means of a weld connection. Naturally, any other mode of manufacturing known to the expert is also possible.

At the end facing away from the sealing cone (42), two geometrically facing, rectangular recesses (44) are cut from a short cylindrical section at the guard electrode (4). The recesses (44) extend from the end of the guard electrode (4) facing away from the sealing cone (42), somewhat in the axial direction. The remaining part of the peripheral wall of the tube (41), which is not cut through by the recesses (44), forms two approximately semicircular segments to which an outer thread (45) is applied. The sealing cone (43) applied to the guard electrode (4) is of a greater diameter than the sealing cone (32) of the rod electrode (3); however, it corresponds to approximately the same form. This means that the sealing cone (43) is also separated into two conical sections tapering off towards the respective ends of which the conical surface (46) serves for guiding the insulating layer, and the conical surface (47) is in the form of an additional sealing cone surface. The inner conical surface of the sealing cone (42) and the outer conical surface of the sealing cone (35) form two additional elements of the sealing cone connection of the invention.

Figure 4:
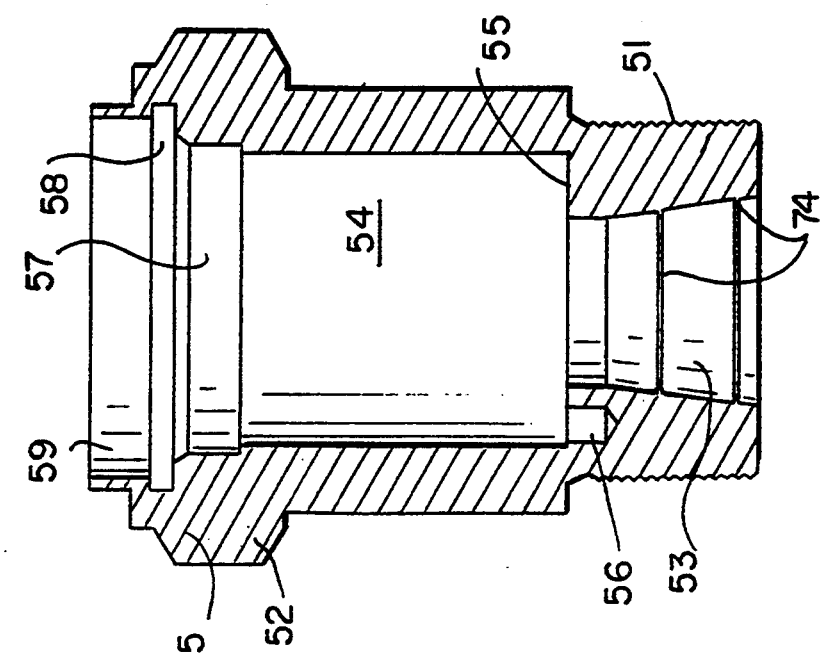
FIG. 4 shows an axial cross section of the screw-in piece.

FIG. 4 shows the axial cross section through the screw-in piece (5). The screw-in piece (5) serves for the attachment of the measuring probe (1), by means of the outer thread (51), inside the container wall (2), forming an additional part of the conical connection of the invention, as well as surrounding those parts of the connection against the effect of which the conical connections are supported. For the attachment inside the container wall (2), the screw-in piece (5) is provided with a standardized hexagon (52). The hexagon (52) serves for the intervention of a wrench by means of which the measuring probe (1) is screwed into the container wall (2). Along its symmetrical axis, the screw-in piece (5) is penetrated by a circular, continuous opening.

Same is composed of individual sections of varying diameter. Coaxially to the thread (51), there is an initial section of the opening in the form of a truncated cone. Its length and incline are again selected so that the inner conical surface (53) forms a sealing cone which interacts with the conical surface (47) of the guard electrode (4) and forms the additional part of the sealing cone connection of the invention.

Following the conical surface (53), there is a section of larger diameter which forms the interior space (54). The interior space (54) serves to accommodate those attachment parts which find application for the electrically insulated attachment of a metal probe electrode in the opening of a housing, in accordance with the invention. Between the conical surface (53) and the inner space (54), a short piece of cylindrical diameter is located. Its length may vary with respect to its manufacture. Due to the differing diameters of the conical surface (53) and the inner space (54), a circular shoulder (55) is formed which radially extends from the conical surface (53) and against which in the assembled state a spring is supported. The shoulder (55) has a short cylindrical bore (56) which is to accommodate the locking pin (111) of the pressure spring (110).

On the side facing away from the conical surface (53), a cylindrical opening (57) of larger diameter connects to the inner space (54). The same is intended to accommodate a rotary shaft seal. The subsequent short cylindrical sections (58, 59) are provided to accommodate the attachment elements for the mechanical connection of the screw-in part (5) with the housing (9). For this purpose, the groove (58), penetrating a portion of the wall, extends radially beyond the diameter of the cylindrical section (59) and forms a shoulder against which, in the assembled state of the measuring probe (1), an insert disk is supported. Furthermore, the openings (54, 57, 58) serve to accommodate the electrical connections necessary between the rod electrode (3), the guard electrode (4) and the electronic circuit (10). Their function is to be addressed later in greater detail.

In FIG. 5, in an axial cross section from below, the insulation nut (6) is shown. The insulation nut (6), in cooperation with the outer thread (37) mounted at the rod electrode (3), has the primary function of attaching the sealing cone connection in a mechanically releasable manner. The second task consists of insulating the rod electrode (3) and the metallic guard electrode (4) with respect to the screw-in piece (5). These tasks are achieved in that the insulation nut (6) is produced from a synthetic insulating material, preferably from a polyphenyl sulfide, and is formed from two functionally determined areas. The first area is of cylindrical form and surrounds an attachment element as well as insulation elements, while the second, flange-like area serves for the insulated support and enclosure of metallic conductors. The insulation nut (6) may be produced in metal-cutting process or also as a molded part. A portion of the insulation nut (6) is axially penetrated by the pot-like opening (61). In the assembled state, the rod probe (3) and the guard probe (4) assume a position in which the ends of both probes, which are facing away from the container, extend into the opening (61) and are surrounded in a pot-like manner by insulation. Subsequent to the opening (61), a bore (62) extends and penetrates the insulation nut (6) entirely. The inner surface of the bore (62) is provided with an inner thread (63). The inner thread (63), during the joining of the measuring probe (1), picks up the outer thread (37) of the rod electrode (3). A short cylindrical section of greater diameter between the opening (61) and the inner thread (63) facilitates the screwing in of the outer thread (37).

The bore (62) is surrounded by two approximately semicircular grooves (64, 65). The grooves (64, 65) break through the insulation nut (6) from the opening (61) in an equally complete manner. Along a hole circle periphery, the two grooves (64, 65) represent two symmetrically facing segments of a hole circle in which the hole circle diameter corresponds to the neutral fiber of the tube wall diameter of the tubular section (41) of the guard electrode (4). In the assembled state, the two remaining semicircular cross pieces of the tubular section of the guard electrode (4), which are not penetrated by the recesses (44), are guided through the grooves (64, 65) such that the thread (45) extends out of the insulation nut (6). Simultaneously, the semicircular cross pieces are electrically insulated from all other metallic, i.e., electrically conductive parts. The flange-like area (66) of greater diameter is supported with its cover surface by the wall of the opening (54) of the screw-in piece (5) and thus prevents contact with the electrically conductive parts. The collar (67), extending from the front face of the flange (66) somewhat in the direction of the probe head housing (9) also serves as insulation.

The cylindrical area of the insulation nut (6), which is not formed by the flange (66), assumes the form of a bushing, its outer cover surface (68) forms, in conjunction with the inner wall of the opening (54) of the screw-in piece (5), the guide of the pressure spring (110). The latter is supported in the installed state by the annular support surface (69) which extends radially and on which the front face of the flange (66), facing the inner space of the container, is formed. The contact surface (69) is penetrated by an opening (113) into which, in the installed state, the second locking pin (112) of the pressure spring (110) grips.

The individual parts of the measuring probe (1) described so far are assembled in the following manner.

As can be seen from FIG. 1, the cover surface of the rod electrode (3) is surrounded with an insulation layer for the prevention of current leakages. The insulating layer may be made from a typical insulating pipe or insulating hose, preferably from polytetrafluorethylene. A first section of the insulation (71) is pushed from the side of the attachment bolt (33) over the rod (31) until the end of the insulation (71), facing the interior of the container, is located at the section (36) of the sealing cone (32). The other end of the insulation (71) will then coincide with the shoulder (39). A second part (72) of the insulation is subsequently pushed from the other side across the rod (31) until its end extends somewhat beyond the sealing cone (32) and overlaps the insulation (71) a short ways. The conical surface (34) facilitates the application of the insulating layer (72) here. The insulating layer (72) extends in this position somewhat beyond the end of the rod (31). A plug (73) of the same material, inserted into this projection, then closes off the front face of the rod (31) in a completely insulating manner.

In an additional work process, the guard electrode (4) is also surrounded with an insulating layer. This takes place such that an insulating pipe or hose (81) is again pushed over the cylindrical section (41) such that the sealing cone (43) is covered and the end of the insulation (81) facing the interior of the container assumes a position between the two sealing cones (7 and 8) such that a precalculated partial piece of the metal guard electrode (4) remains free of all insulation. The other end of the insulation (81) extends directly to the recesses (44). Also here, the conical surface (46) facilitates the application of the insulating layer (81). Now, the guard electrode (4) is guided across the rod electrode (3) until the inner conical surface of the sealing cone (42) of the guard electrode (4) assumes a position opposite the conical surface of the sealing cone (35) of the rod electrode (3). An electrically conductive metallic connection rod (11) is screwed into the inner thread (38) and is thus connected with the rod electrode (3). Subsequently, the created structural unit is guided into the conical opening of the screw-in piece (5) until the conical surface (47) of the guard electrode (4) assumes a position opposite the conical surface (53). At that time, both electrodes extend into the inner chamber (54) and the connection rod (11) extends through the screw-in piece (5). Now, from the cylindrical opening (59), the pressure spring (110) is introduced into the inner chamber (54) such that the locking pin (111) rests in the bore (56). Upon introduction of the insulation nut (6), the locking pin (112) rests in the opening (113) of the insulation nut (6). Now, the joining of the conical connection can take place. By screwing the probe rod (3) into the screw-in piece (5), it is achieved that the insulation nut (6) is held against the torsional effect of the spring (110) in its position and the outer thread (37) of the rod probe (3) is screwed into the inner thread (63) of the insulation nut (6). Since, at that time, the insulation nut (6) Supports itself against the axial effect on the spring (110), the formation of the screw connection between the rod probe (3) and the insulation nut (6) is connected with a change of the longitudinal position of both probes (3, 4) to each other and simultaneously with respect to the screw-in piece (5). Since, during this movement, the conical surface (35) of the rod electrode (3) supports itself against the conical surface (42) of the guard electrode (4) and simultaneously the conical surface (47) of the guard electrode (4) against the conical surface (53) of the screw-in piece (5), both conical connections (7, 8) are formed simultaneously by being pressed together and are closed by the inclusion of the insulation layers (72, 81). Nose-like raised areas (74), circulating at the surfaces of the sealing cones, additionally influence the flow movement of the insulation layer caused by the pressure of the conical surfaces.

The measuring probe (1) is completed by the screwing on of a metallic thread casing (12) onto that part of the outer thread (45) of the guard electrode (4) which penetrates and projects beyond the insulation nut (6). Here, the end of the thread casing (12), facing the interior of the container, assumes a position inside the collar (67) of the insulation nut (6). The metallic thread casing (12) represents the electrical connection between the metallic guard electrode (4) and the electronic circuit (10) in the interior (91) of the housing (9).

Rotary shaft seals (92, 93) close the inner space (54) of the screw-in piece (5) with respect to the inner space (91) of the housing (9). For this purpose, the rotary shaft seal (92) is arranged in the cylindrical opening (57) of the screw-in piece (5) and the rotary shaft seal (93) in the interior of the thread casing (12). In the case of the rotary shaft seals (92 and 93), conventional rotary shaft seals may be used.

For the mechanical connection of the screw-in piece (5) with the housing (9), several screw connections (94), of which only one is shown, are connected with an insert disk (95) in a nonreleasable manner. The insert disk (95) is arranged in the interior of the groove (58) of the housing (5). The screw connections (94), arranged on a hole circle, penetrate the floor (96) of the housing (9). For the purpose of sealing against the surrounding area, sealing rings are provided between the screw-in piece (5) and the housing (9).

In the inner space (91) of the housing (9), a printed circuit (13) is arranged. On it, electronic components, not shown, are present which, together with the, also not shown, conducting tracks, form the electronic circuit (10) of the sensor (1). A line (14) establishes the electrical connection between the metallic thread casing (12) and the printed circuit (13). Thus, the metallic guard electrode (4) is electrically connected with the printed circuit (13) and thus with the electronic circuit (10).

Furthermore, the printed circuit (13) is penetrated by the connection rod (11). The printed circuit (13) thus assumes, on the connection rod (11), a position in which the connection rod (11) projects somewhat through the printed circuit (13). The connection rod (11) represents the electrical connection between the rod electrode (3) and the electronic circuit (10). For this purpose, the connection rod (11) inside the thread casing (12) and the housing (9) is arranged such that it is electrically insulated from the other metallic parts. At its end, which is projecting into the inner space (91), the connection rod (11) is provided with a screw connection (15). An electrical conductor (16) now establishes the electrical connection between the rod electrode (3) and the printed circuit (13) and thus to the electronic circuit (10). The connection of the electronic circuit (10) with the evaluation and switching devices, which are frequently removed in a control station from the measuring site, takes place by means of a connection line, not shown, which is guided through the opening (17) of the housing (9).

From FIG. 1, it can be clearly seen that, as compared with the state of the art up to now, it is possible with the device of the invention to undertake the attachment of a metallic probe electrode in the opening of a housing such that the metallic rod electrode, as well as the metallic guard electrode by means of a single insulating screw connection, are electrically insulated and attached in a pressure-sealed manner with respect to each other in the opening of a screw-in piece housing.

Figure 6:
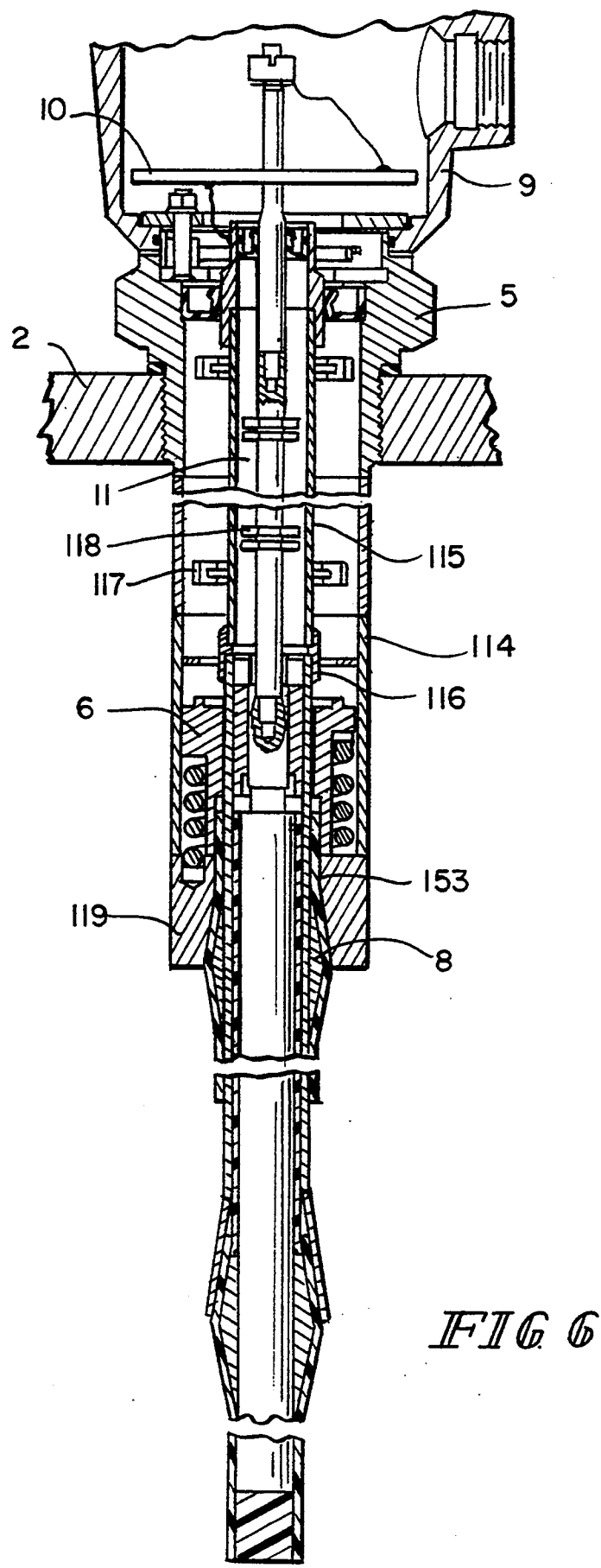
FIG. 6 shows an additional arrangement of the invention.

In FIG. 6, an additional example of the device of the invention is shown. It distinguishes itself with respect to the arrangement shown in FIG. 1 merely in that between the screw-in piece (5) and the first conical seal connection (8) a metallic intermediate piece (114) is arranged. The same has the task of arranging the active portion of the measuring probe (1) such that it extends further into the inner chamber of the container. For this purpose, a metal pipe (115) establishes the electrical connection between the guard electrode (4) and the electronic circuit (10). The metal tube (115) is mechanically, as well as electrically, connected with the guard electrode (4) by means of a threaded sleeve (116). Several spacer rings (117) of an electrically insulating material extend radially from the cover surface of the tube (115) into the space between the metal tube (115) and the intermediate piece (114). They prevent the metal tube (115) from entering into electrical contact with the inner wall of the intermediate piece (114).

The electrical connection of the rod electrode (3) and the electronic circuit (10) is established by means of an extended connection rod (11). On its cover surface, spacer rings (118) are also arranged in order to ensure the electrical insulation with respect to the inner wall of the metal tube (115).

In this example, the conical connection (8) is not established by means of the screw-in piece (5) but a tapered receptor (119), provided especially for this purpose, takes over all tasks connected with the attachment of the rod electrode (3) and the guard electrode (4) (except for the attachment of the measuring probe (1) inside the container wall (2)).

Naturally, the invention may also be applied when it is desired or necessary to surround the metallic guard electrode with a complete insulation rather than with a partial insulation.

We claim:

1. Device for measuring contents in a container or a level height in a channel, the device comprising:
   a) a metallic rod electrode (3), a metallic guard electrode (4), and a housing (5);
   b) the rod electrode (3), the guard electrode (4), and the housing (5) including conical sealing surfaces (35, 42, 47, 53) arranged such that they form between the conical surfaces of the rod electrode (3) and the guard electrode (4), as well as between the conical surfaces of the guard electrode (4) and the housing (5), sealing cone connections (7, 8) which are facing each other;
   c) the rod electrode (3) and the guard electrode (4) being insulated from each other (71, 72, 81) and the sealing cone connections (7, 8) being held in engagement by a nut (6) insulating the electrodes (3, 4) as well as the electrical connections (11, 12) of the electrodes and a pressure spring (110) in the interior of the housing (5).

2. Device, in accordance with claim 1, characterized in that the guard electrode (4) coaxially grips around the rod electrode (3) while enclosing an insulation (71, 72).

3. Device, in accordance with claim 1, characterized in that the conical connections (7, 8) lock the rod electrode (3) with respect to the guard electrode (4) and the guard electrode (4) with respect to the housing (5) in a pressure-sealed manner while using the insulating layer (71, 72, 81).

4. Device, in accordance with claim 1, characterized in that the rod electrode (3) and the insulation nut (6)

form the screw connection arranged in the interior of the housing (5).

5. Device, in accordance with claim 4, characterized in that the rod electrode (3) has, at its end facing away from the container interior, a connection and attachment bolt of smaller diameter (33) on which an outer thread (37) is applied.

6. Device, in accordance with claim 4, characterized in that the insulation nut (6) is held in its position against the torsional and axial effect of the pressure spring (110).

7. Device, in accordance with claim 1, characterized in that the housing (5) is a screw-in piece with the aid of which the measuring probe (1) is attached in the wall (2) surrounding the measuring medium.

8. Device, in accordance with claim 1, characterized in that the rod electrode (3) is connected with a sealing cone (32) which encircles the probe rod (31) and is formed by two truncated cone surfaces (43, 35) tapering off towards the ends of the sealing cone (32).

9. Device, in accordance with claim 8, characterized in that a recess (36) is formed at the sealing cone (32).

10. Device, in accordance with claim 8, characterized in that the probe rod (31) and the sealing cone (32) are connected with each other by means of a welding process.

11. Device, in accordance with claim 1, characterized in that at the guard electrode (4), sealing cones (42, 43) are formed.

12. Device, in accordance with claim 11, characterized in that the sealing cone (42) expands in the direction towards the interior of the container.

13. Device, in accordance with claim 11, characterized in that the sealing cone (43) encircles the cover surface of the tubular portion (41) and is formed from two truncated cone-like surfaces (46, 47) which taper towards the ends of the sealing cone (43).

14. Device, in accordance with claim 1, characterized in that the guard electrode (4) is penetrated at its end facing away from the sealing cone (42) by two geometrically facing recesses (44).

15. Device, in accordance with claim 14, characterized in that the segments not penetrated by the recesses (44) are semicircular and are provided with an outer thread (45).

16. Device, in accordance with claim 1, characterized in that the insulation nut (6) is formed from the two functionally determined areas attachment nut (62, 63) and insulation flange (66, 67).

17. Device, in accordance with claim 16, characterized in that the flange (66) supports the electrical conductors (11, 12) of the rod electrode (3) and of the guard electrode (4) with respect to the housing (5) in an insulating manner at the wall of the inner chamber (54).

18. Device, in accordance with claim 16, characterized in that the insulation nut (6) has an axially arranged inner thread (63).

19. Device, in accordance with claim 18, characterized in that the ends of the guard electrode (4), facing away from the inner space of the container and penetrated by the recesses (64, 65) of the insulation nut (6), are in semicircular form.

20. Device, in accordance with claim 16, characterized in that the insulation nut (6) is penetrated by openings (62, 64, 65) through which the electrical connection of the rod electrode (3) and of the guard electrode (4) are guided with the electronic circuit (10) in an electrically insulated manner from each other.

21. Device, in accordance with claim 16, characterized in that the insulation nut (6) is produced from an electrically insulating material.

22. Device, in accordance with claim 1, characterized in that in the interior (54) of the housing (5) a pressure spring (110) is supported on the shoulder (55) of the housing (5) and on the shoulder (69) of the insulation nut (6).

23. Device, in accordance with claim 22, characterized in that the pressure spring (110) has locking pins (ill, 112).

24. Device, in accordance with claim 23, characterized in that the locking pins (111, 112) grip into the bores (56) of the screw-in part (5) and (113) of the insulation nut (6).

25. Device, in accordance with claim 1, characterized in that in the inner space (91) of the probe head housing (9) the electronic circuit (10) of the measuring probe (1) is arranged.

26. Device, in accordance with claim 1, characterized in that the inner space (54) of the housing (5) is sealed by means of rotary shaft seals (92, 93).

27. Device, in accordance with claim 1, characterized in that an intermediate piece (114) is arranged between the housing (5) and the cone connection (8).

28. Device, in accordance with claim 27, characterized in that the electrical connection of the guard electrode (4) with the electronic circuit (10) takes place by means of a metal tube (115), arranged in the interior of the intermediate piece (114).

29. Device, in accordance with claim 27, characterized in that a threaded sleeve (116) connects the guard electrode (4) in an electrically conductive manner with the metal tube (115).

30. Device, in accordance with claim 27, characterized in that between the electrical connection rod (11) and the metal tube (115), as well as between the metal tue (115) and the intermediate piece (114), electrically insulating spacer rings (117, 118) are arranged.

31. Device, in accordance with claim 1, characterized in that the conical surface (153) is formed at the tapered receptor (119).

32. Device, in accordance with claim 1, characterized in that the attachment elements of the rod probe (3) and of the guard electrode (4) are arranged in the interior of the tapered receptor (119).

33. A probe apparatus comprising:
a metallic rod electrode formed to include a conical surface;
a housing formed to include an interior region and a conical surface defining an opening into the interior region;
a metallic guard electrode having a first conical surface configured to engage the conical surface of the rod electrode and having a second conical surface configured to engage the conical surface of the housing;
an insulation layer located between the rod electrode and the guard electrode
a nut coupled to the rod electrode, the nut being located in the interior region of the housing; and
a pressure spring located in the interior of the housing for biasing the nut and the rod electrode in a predetermined direction to hold the first conical surface of the guard electrode in engagement with the conical surface of the rod electrode to form a first cone-shaped sealing connection therebetween and to hold the second conical surface of the guard electrode in engagement with the conical surface of the housing to form a second cone-shaped sealing connection therebetween.

* * * * *